United States Patent [19]

Accattino et al.

[11] Patent Number: 4,791,437

[45] Date of Patent: Dec. 13, 1988

[54] MULTIPLE NOZZLE INK JET DOT PRINTER

[75] Inventors: Andrea Accattino, Romano; Aldo Chiaro, Caluso, both of Italy

[73] Assignee: Ing. C. Olivetti & C., S.p.A., Ivrea, Italy

[21] Appl. No.: 945,524

[22] Filed: Dec. 23, 1986

[30] Foreign Application Priority Data

Dec. 23, 1985 [IT] Italy .............................. 68097 A/85

[51] Int. Cl.[4] .............................................. G01D 15/16

[52] U.S. Cl. .................................. 346/140 R; 346/75; 400/126

[58] Field of Search ........ 346/140 PD, 139 C, 140 R, 346/75; 400/126

[56] References Cited

U.S. PATENT DOCUMENTS

| | | | |
|---|---|---|---|
| 4,277,790 | 7/1981 | Heibein et al. | 346/75 |
| 4,408,907 | 10/1983 | Bernardis | 400/124 |
| 4,412,226 | 10/1983 | Yoshida | 340/75 |
| 4,485,386 | 11/1984 | Dagna et al. | 346/140 |
| 4,533,927 | 8/1985 | Iwagami et al. | 346/140 |
| 4,543,591 | 9/1985 | Terasawa | 346/140 |
| 4,571,600 | 2/1986 | Hara | 346/140 |
| 4,594,598 | 6/1986 | Iwagami | 346/140 |
| 4,600,931 | 7/1986 | Terasawa | 346/140 |
| 4,639,736 | 1/1987 | Jochimsen | 346/75 |

FOREIGN PATENT DOCUMENTS

| | | | |
|---|---|---|---|
| 0031421 | 7/1981 | European Pat. Off. | |
| 0230135 | 12/1986 | European Pat. Off. | |
| 0047671 | 3/1982 | Japan | 346/140 PD |

*Primary Examiner*—E. A. Goldberg
*Assistant Examiner*—Huan H. Tran
*Attorney, Agent, or Firm*—Banner, Birch, McKie & Beckett

[57] ABSTRACT

Each print element is connected to the head by means of a resilient blade pivoted on the head and is movable in two directions, respectively parallel and perpendicular to the direction of movement of the head, to vary the relative position of the nozzles. The nozzles of the print elements are disposed along a straight line which is inclined with respect to the direction of movement of the head. The head can be rotated to vary the inclination of the nozzles, thereby to provide different print definitions. A parking station is further provided for the head to clean and keep the nozzles in contact with an atmosphere saturated with a solvent for the ink, to prevent the ink from drying out in the nozzles.

5 Claims, 4 Drawing Sheets

MULTIPLE NOZZLE INK JET DOT PRINTER

BACKGROUND OF THE INVENTION

The present invention relates to an ink jet dot printer comprising a print head for serial printing of symbols along a printing line on an information carrier, in accordance with a predetermined printing matrix, the head having a plurality of print elements, each provided with a nozzle for selectively projecting drops of ink on to the information carrier in print positions in accordance with the matrix.

Ink jet dot printers are known in which the head comprises a plurality of print elements. One known head is mounted on a movable carriage and is formed by a single block of resin in which a large number of ink jet print elements are incorporated. Each element is formed by a tube provided with a nozzle and associated with a piezoelectric transducer for on-demand expulsion of drops of ink.

In the heads of such printers, the print elements must be positioned with a high degree of accuracy, involving the use of complicated and expensive equipment. In addition such heads require accurate manufacture of the parts which are coupled to the carriage whereby the printer is altogether expensive and complicated in construction.

SUMMARY OF THE INVENTION

The object of the present invention is to provide an ink jet printer which is simple in construction and of low cost and in which the print elements are mounted individually on the head without requiring complicated adjustment operations.

The invention accordingly provides a printer wherein adjusting means are interposed between the print elements and the head for correcting any deviations in respect of the print positions according to the printing matrix.

Those and other features of the invention will be more clearly apparent from, the following description of a preferred embodiment which is given by way of non-limiting example with reference to the accompanying drawings.

DETAILED DESCRIPTION OF THE PREFERRED EMBODIMENT

Figure 1:
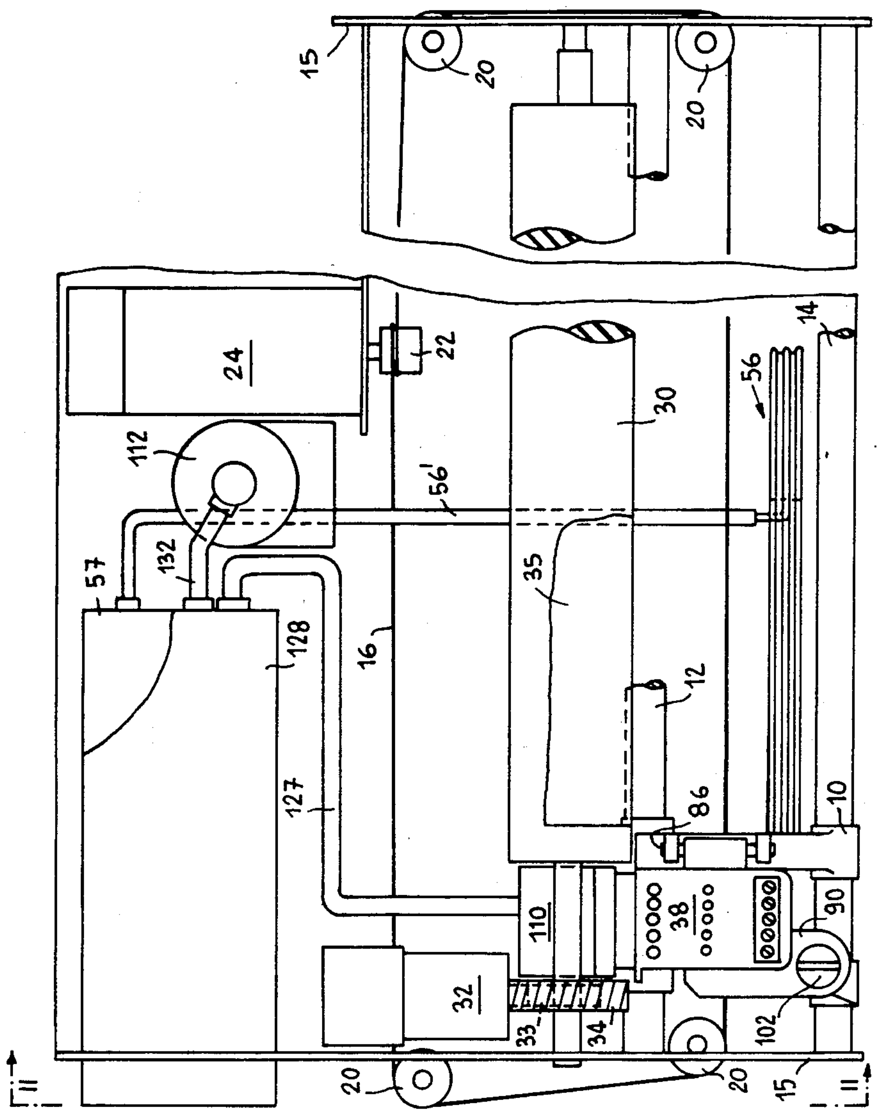
FIG. 1 is a plan view of part of the printer according to the invention.
Figure 2:
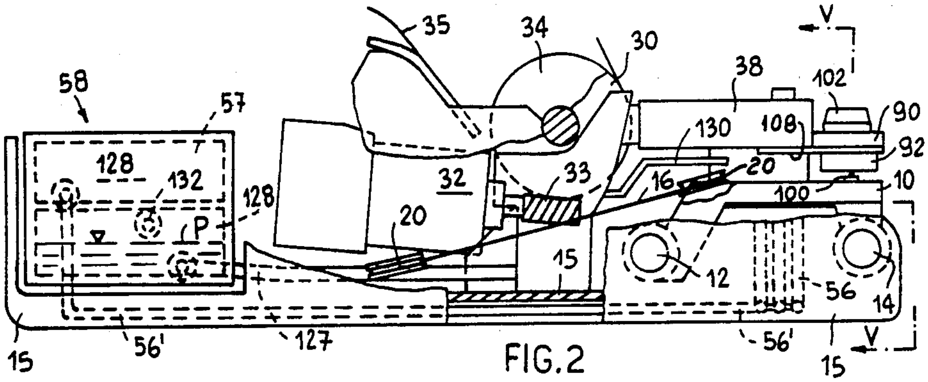
FIG. 2 is a side view of the printer taken along line II—II in FIG. 1.

Referring to FIGS. 1 and 2, a carriage 10 is slidable on guides 12 and 14 parallel to and fixed with respect to a frame structure 15 of the printer.

The carriage 10 is entrained by a cord 16 which is fixed at its ends to the carriage and which is passed around direction-changing pulleys 20 and a drive roller 22. The roller 22 is rotated by a d.c. motor 24 which is rotatable in both directions. A platen roller 30 is rotatable on the frame structure 15 and is rotated by a stepping motor 32 by way of an endless worm 33 and a helicoidal wheel 34 for producing intermittent line-spacing movements of a print carrier 35, normally a sheet of paper, which is wound around the roller 30.

Figure 6:
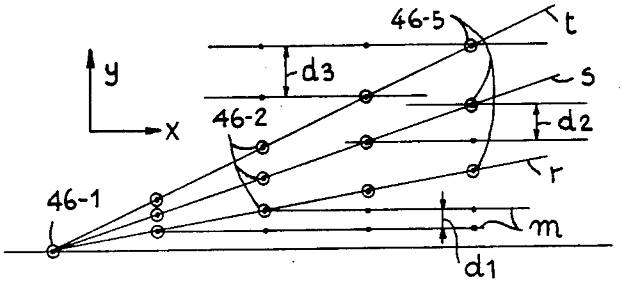
FIG. 6 is a diagrammatic representation of the print definitions which can be obtained with the head.

Mounted on the carriage 10 is a print head 138 (see FIGS. 3 and 4) comprising a support 39 which, in accordance with a preferred but non-limiting embodiment, carries five ink jet dot print elements 40 which are arranged in side-by-side relationship and which are each provided with a nozzle 46 for expulsion of the drops of ink. The nozzles 46 are aligned along a straight line 'r' (see FIG. 6) which is inclined with respect to the direction 'x' of movement of the carriage in such a way that each nozzle 46-1 . . . 46-5 prints on lines m which are spaced from each other by a predetermined constant distance d1.

The print elements 40 (see FIG. 4) may be of any known type, for example of the type described in our European patent application No. 86306640.3 More particularly each element 40 is formed by a glass capillary ejector tube 42 on which is fixed a sleeve-type piezoelectric transducer 43 which is activated by electrical pulses to expel drops of ink from a nozzle 46 disposed at one end 44 of the tube 42. The tube 42 may also be of metal or ceramic material and communicates at the other end 48 with an ink feed conduit 50 made of an elastic and hence flexible material. The conduit 50 is provided with a porous capillary filter 52 such as to prevent emptying of the conduit 50 and the tube 42.

The hydraulic characteristics of the conduit 50 with respect to the pressure waves generated by the transducer 43 in the tube 42 are such that it is equivalent to a reservoir of infinite capacity whereby the pressure waves reflected by the ends 44 and 48 of the tube 42 are automatically damped, as described in detail in our U.S. patent application Ser. No. 858,692 The conduit 50 communicates with an auxiliary reservoir 54 which is common to all five print elements 40 and which is fixed to the support 39 of the head.

The auxiliary reservoir 54 is connected by means of a flexible conduit 56 and 56' to a main reservoir 57 (see FIGS. 1 and 2) for the ink which is interchangeable and fixed to the frame structure 15. The conduit 56 is reinforced by two ribs 156 and 256 connected laterally to the central tube 55 to permit flexing of the conduit 56 during movement of the head.

The central part of the tube 42 with the associated transducer is embedded in a block 60 of resin, from which the tube 42 projects by means of the ends 44 and 48 thereof. The end 44 passes through an opening 62 in the support 39 and is protected by a portion 64 of the block 60.

By virtue of small variations in the speed of expulsion of the drops from the various nozzles 46 or by virtue of slight structural differences in the print elements 40, some drops may reach the paper 35 in non-aligned positions in the preselected dot matrix, with a corresponding deterioration in the quality of the print According to the invention, to permit speedy adjustment of the position of the nozzles in the horizontal direction 'x' of movement of the carriage 10 and in the vertical direction 'y' (FIG. 6), each print element 40 is connected to the support 39 (see FIGS. 3 and 4) of the head by a resilient plate or blade 66. The blade 66 is fixed at one of its ends 68 (see FIG. 4) to the block 60 and at approximately halfway along its length is pivoted on a pin 69 which is fixed to the support 39. The blade 66 is fixed to the block 60 by means of welding or ultrasound but alternatively it may be fixed in position by being glued or encased within the block 60.

Another end 70 of the blade 66 is provided with a slot 72 engaged with an eccentric boss or lug 74 on an adjusting pin 76 which is rotatable in the support 39.

Figure 3:
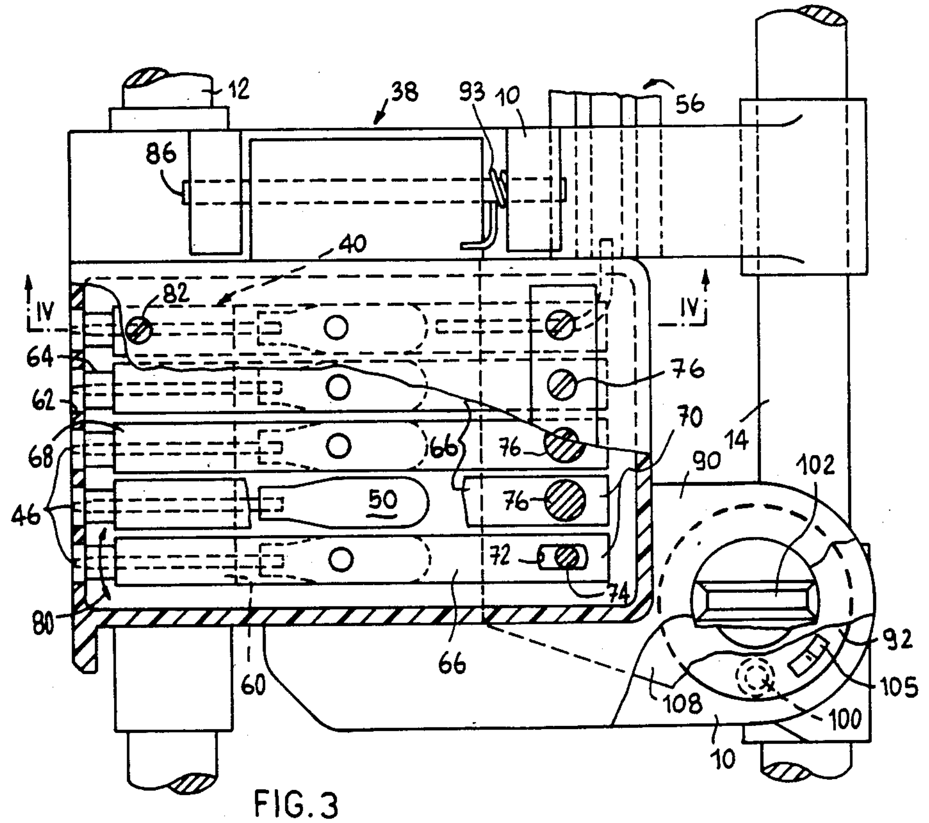
FIG. 3 is a partly sectional plan view of the print head on an enlarged scale.
Figure 4:
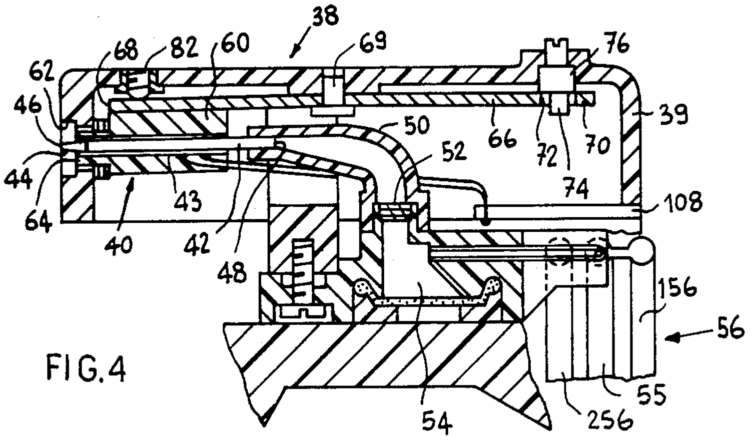
FIG. 4 is a view of the head in section taken along line IV—IV in FIG. 3.

Rotary movement of the pin 76 causes rotary movement of the blade 66 about the pin 69 and thus displacement of the nozzle 46, as indicated by the double-headed arrow 80 in FIG. 3, parallel to the line of printing.

A screw 82 mounted on the support 39 bears against the end 68 of the blade 60. Rotating the screw 82 in one direction or the other, the blade 60 is bent in the "y" direction, so that it produces corresponding displacement of the nozzle 46 in the direction 'y' (See FIG. 6). Careful adjustment of the screw 82 and the pin 76 provides that the drops of ink from each nozzle 46 fall precisely on the corresponding rows m and perfectly disposed in columns in direction 'y'.

In the printer according to the invention, the angle of inclination of the line 'r' in which the nozzles 46 are aligned (see FIG. 6) may be varied to vary the print definition, that is to say the distance d between the printing lines m.

Figure 5:
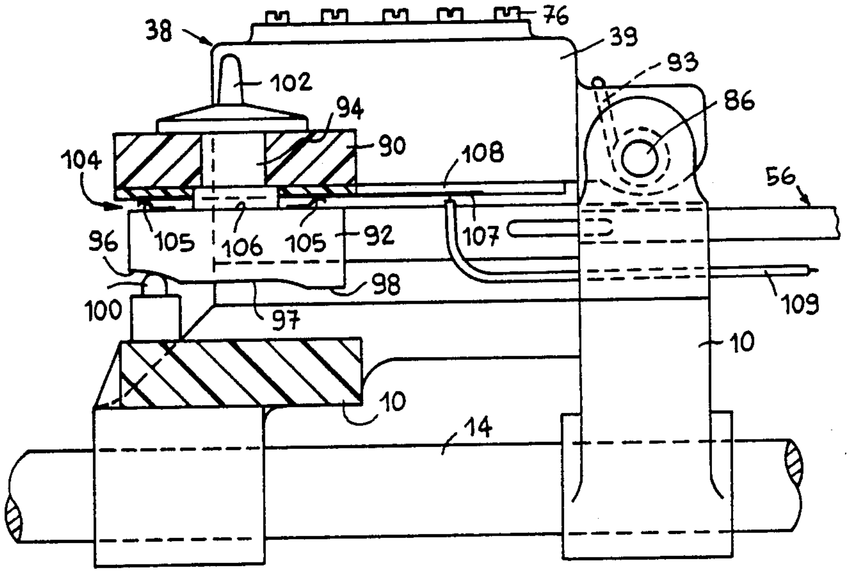
FIG. 5 is a view of the head in section taken along line V—V in FIG. 2.

To provide for different angles of inclination of the line r, the support 39 (see FIG. 5) is pivotally mounted on a pin 86 which is fixed to the carriage 10 and perpendicular to the direction 'x' of movement of the carriage 10. Mounted on a projection 90 on the support 39 is a face cam 92 which is fixed with respect to a journal 94 which is rotatable on the projection 90. The cam 92 is provided with a stepped profile, having for example three steps 96, 97 and 98, engaged with a cam follower in the form of a post 100 which is fixed with respect to the carriage 10. The cam 92 can be rotated manually by means of a handle 102, to assume three angular positions corresponding to each of the three steps 96 to 98 and consequently the head 38 is rotated about the pin 86 against the action of a return spring 93, assuming three selectible angles of inclination as diagrammatically indicated in FIG. 6 by 'r', 's' and 't'.

Thus, a different print definition, for example: 300; 240; 200 dots/inch corresponds to each position of the cam 92.

Figure 9:
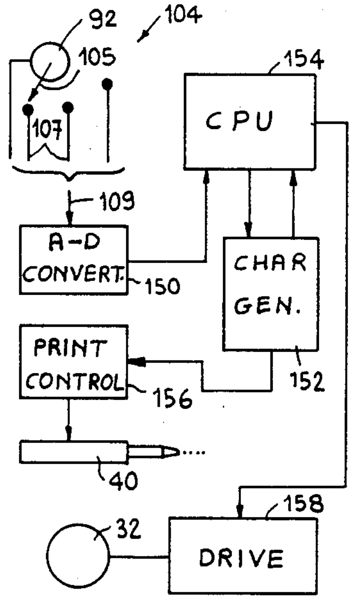
FIG. 9 is a simplified electrical block circuit diagram of a control circuit of the printer.

The cam 92 (see FIG. 5) comprises a switch 104 formed by electrical contacts 105 disposed on an upper face 106 of the cam 92 and bearing against corresponding tracks 107 of a printed circuit 108 fixed to the support 39. By means of a flexible cable 109, for each angular position of the cam 92 the switch 104 transmits signals corresponding to each preselected print definition by means of an analog-digital converter 150 (see FIG. 9) of a control circuit. The converter 150 conditions a character generator 152 controlled by a microprocessor-type control unit 154 for selecting the pitch between the successive dots printed in accordance with the preselected print definition. A control circuit 156 connected to the generator 152 then activates the print elements 40. At the same time the unit 154 activates a circuit 158 for controlling the motor 32 to set the line spacing corresponding to the preselected print definition.

It frequently happens during periods of inactivity of the head that the ink in the nozzle 46 tends to dry up, causing the nozzle to be blocked when printing operation is resumed.

To overcome that disadvantage, the printer according to the invention has a parking station 110 (see FIG. 1) for sheltering the head 38, which is predisposed to operate in two modes. In the first mode of operation the station keeps the nozzles in an atmosphere with a controlled level of relative humidity to prevent the ink of the meniscus in each nozzle from drying out. In the second mode of operation, the station 110 is connected to a suction pump 112 (see FIG. 1) to produce a depression on the nozzles, from the outside, in order to remove therefrom any bubbles of air or solidified particles of ink, which interfere with operation of the nozzles.

Figure 7:
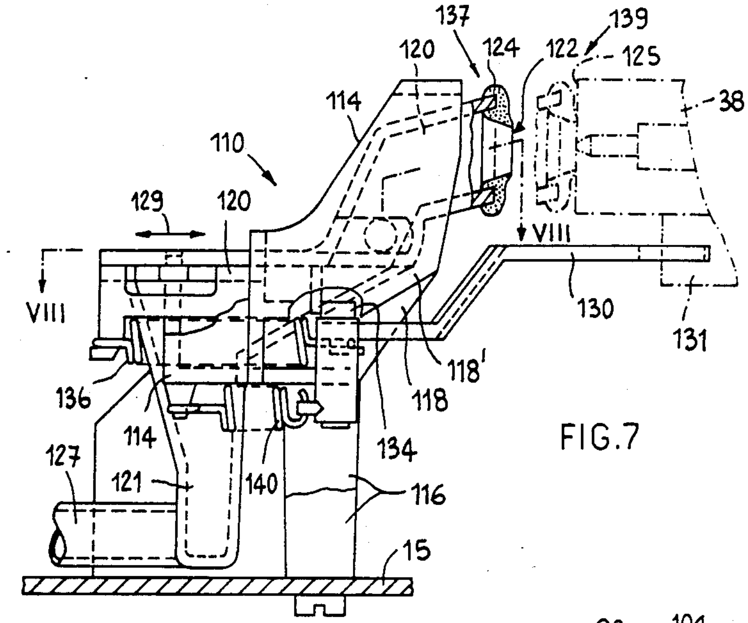
FIG. 7 is a side view of the sheltering station on an enlarged scale.

The parking station 110 (see FIGS. 1 and 7) is disposed at one end of the platen roller 30, beyond the printing zone, and is formed by a support 114 fixed to the frame structure 15 of the printer by means of pillars 116. An ink recovery container 120 is arranged internally of two side walls 118 and 118' of the support 114.

The container 120 is terminated in an upper part thereof by an opening 122 and the head 38 is automatically moved into a position in front of the opening 122 during the periods of inactivity. The opening 122 is of dimensions such as to embrace all the nozzles of the head 38.

The edge of the opening 122 is provided with a soft rubber seal 124 to achieve perfect adhesion as between the container 120 and the front surface 125 of the head 38. The container 120 extends downwardly forming an ink collection chamber 121. The chamber 121 communicates by way of a tube 127 with a reservoir 128 (see FIG. 2) containing a solvent for the ink and disposed beneath the main ink reservoir 57. The tube 127 is connected to the reservoir 128 below the free level P of the solvent whereby the vapours of solvent fill the whole of the tube 127 and the container 120. The reservoirs 128 and 57 form a single interchangeable cartridge 58 which can be fitted into the frame structure 15 of the printer, behind the platen roller 30.

The reservoir 128 is further connected to the suction pump 112 by way of a conduit 132 communicating with the reservoir 128 above the free level of the solvent. The reservoir 128 is filled for example with water for a water-base ink. Therefore, the container 120 in the sheltering station freely communicating with the water reservoir 128, the level of relative humidity within the container 120 will be maintained around values of between 70 and 80%, such as to prevent the ink meniscus in the nozzles from drying out.

Figure 8:
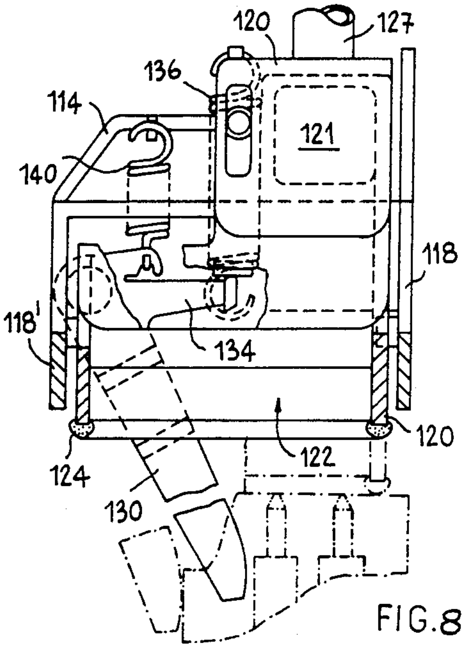
FIG. 8 is a view of the sheltering station in section taken along line VIII—VIII in FIG. 7.

The container 120 (see FIG. 7) can move within the support 114 in the direction indicated by the arrow 129, from a rest position to an operating position in contact with the head 38 to carry out the nozzles cleaning and humidifying operations. The container 120 is moved by a lever 130 which is pivoted on the support 114 and actuated by a shoulder 131 on the head 38. The lever 130 is provided with an arm 134 connected to the container 120 by means of a spring 136. In addition, the lever 130 is held in the position shown in FIG. 8 in which the opening 122 is spaced from the head 38, by a spring 140 anchored to the support 114.

Whenever interruptions in the printing operation exceed 3 seconds, the head is automatically moved into a position in front of the station 110. At that point the lever 130 is rotated in a clockwise direction by the shoulder 131. By means of the spring 136, the arm 134 moves the container 120 from a rest position 137 (shown in solid lines in FIG. 7) against the head 138 so as to press the seal 124 against the surface 125. In that position as shown in dash-dotted lines at 139, the nozzles of the head 38 remain in contact with the atmosphere inside the container 120 with a high level of relative humidity, whereby the ink is kept in a liquid condition, avoiding the formation of crusting which is harmful to the efficiency of the head.

When one or more nozzles is blocked because of air bubbles or solid particles, the head can be restored to an operational condition by means of a cleaning cycle in the following manner.

With the head in front of the station 110, the pump 112 is operated and produces a depression of about 250 mm Hg at the mouth opening 122 of the container 120. The transducers 43 are excited at the same time. In that way the depression promotes expulsion from the nozzles of a certain amount of ink which entrains either any air bubbles that may be present or the impurities present in the nozzles which have remained blocked. The ink is collected in the chamber 121 and from there is conveyed into the container 128 of the cartridge 58 where it will be mixed with the water contained therein. The cartridge 58 will be replaced by a fresh cartridge when the ink in the container 57 is exhausted.

We claim:

1. An ink jet dot printer comprising a print head mounted on a carriage movable in parallel to a printing line and having a plurality of nozzles aligned along a straight line which is inclined with respect to the printing line of the printer, to print on a carrier dots which are spaced in accordance with a predetermined print definition and adjusting means for rotating the head about an axis perpendicular to the printing line to vary the inclination of the straight line and hence to set predetermined print definitions, wherein said adjusting means comprise a cam rotatable on a vertical axis, said cam having a lower profile provided with a plurality of steps associated with a plurality of degrees of print definitions and engaged with a cam follower provided on said carriage and spring means urging said profile against said cam follower, said cam being integral with a manipulative member for selectively rotating the cam to engage a selected step with the cam follower, whereby a different degrees of print definition corresponding to each angular position of the cam can be repeatedly selected.

2. A printer according to claim 1, wherein said cam comprises an electric switch connected to a circuit for controlling the printing operation for selecting the pitch between the print positions in accordance with each of the print definitions.

3. A printer according to claim 2, wherein said switch comprises two contacts which slide against conducting tracks on a base of a printed circuit fixed to the head, the tracks being connected to the control circuit.

4. An ink jet printer for serially printing dots on an information support along a printing line according to a predetermined print matrix, comprising a print head pivotally mounted on a printer carriage and having a plurality of print elements each provided with an ejecting tube secured to a support block, each tube being associated with a transducer to expel an ink droplet through a nozzle, said nozzles being aligned along a straight line which is inclined with respect to the printing line, to print on said support dots which are spaced in accordance with a predetermined print definition and adjusting means mounted on said head to adjust the nozzle position in both the directions respectively parallel and perpendicular to said print line and said adjusting means being adapted to rotate the head about an axis perpendicular to the printing line to vary the inclination of the head and hence the print definition, said adjusting means comprising a plurality of resilient blades each one associated with one of said blocks and elongated parallel to the corresponding ejecting tube, each blade being pivotally mounted on said head at a point intermediate its ends, each support block being fixed on a first end of the associated blade, a blade bending element screwed on said head and engaging the associated blade in a position near said first end and located between said intermediate point and the corresponding nozzle to adjust individually each nozzle in said perpendicular direction, a second end of each one of said blades being provided with a slot engaged by a manually operable eccentric element to allow an individual adjusting movement of each nozzle in said parallel direction, whereby in each one of said head inclinations the nozzles are simply and quickly adjusted in both said directions.

5. A printer according to claim 4, comprising an intermediate ink reservoir fixed on said head, to supply said tubes with ink, said reservoir being located below the level of said tubes, and a plurality of conduits associated with said tubes for connecting each ejecting tube to said ink reservoir, each one of said conduits being made of a flexible and elastic material so as to allow the adjusting movement of the tube with respect to said fixed reservoir, each one of said conduits being provided with a porous capillary filter so that the conduit and the tube are prevented from emptying of the ink.

* * * * *